United States Patent
Leroux et al.

(10) Patent No.: US 11,554,531 B2
(45) Date of Patent: Jan. 17, 2023

(54) METHOD FOR THE ADDITIVE MANUFACTURING OF AN ELASTOMER PART, AND ASSOCIATED PRODUCTION FACILITY AND PART

(71) Applicant: Association pour les Transferts de Technologies du Mans, Le Mans (FR)

(72) Inventors: Cécile Leroux, Crannes en Champagne (FR); Alexandre Lerat, Le Mans (FR); Michel Dorget, Le Mans (FR)

(73) Assignee: ASSOCIATION POUR LES TRANSFERTS DE TECHNOLOGIES DU MANS, Le Mans (FR)

( * ) Notice: Subject to any disclaimer, the term of this patent is extended or adjusted under 35 U.S.C. 154(b) by 19 days.

(21) Appl. No.: 17/043,215

(22) PCT Filed: Mar. 29, 2019

(86) PCT No.: PCT/EP2019/058059
§ 371 (c)(1),
(2) Date: Sep. 29, 2020

(87) PCT Pub. No.: WO2019/185895
PCT Pub. Date: Oct. 3, 2019

(65) Prior Publication Data
US 2021/0016492 A1    Jan. 21, 2021

(30) Foreign Application Priority Data
Mar. 29, 2018   (FR) ...................... 18 52749

(51) Int. Cl.
B33Y 50/02     (2015.01)
B29C 64/112    (2017.01)
(Continued)

(52) U.S. Cl.
CPC .......... *B29C 64/112* (2017.08); *B29C 64/386* (2017.08); *B33Y 10/00* (2014.12); *B33Y 50/02* (2014.12)

(58) Field of Classification Search
CPC ...................................................... B33Y 50/02
(Continued)

(56) References Cited

U.S. PATENT DOCUMENTS

2016/0185040 A1   6/2016  Costlow
2017/0312981 A1*  11/2017 Selbertinger .......... B33Y 70/00
(Continued)

FOREIGN PATENT DOCUMENTS

WO    200401812 A1   3/2004
WO    2017108071 A1  6/2017

OTHER PUBLICATIONS

French Search Report for PCT/EP2019/058059 dated Jun. 3, 2020.

*Primary Examiner* — Suresh Suryawanshi
(74) *Attorney, Agent, or Firm* — Duane Morris LLP; Arthur M. Dresner

(57) ABSTRACT

A method for the additive manufacturing of an elastomer part, includes—the creation of a model of spatial coordinates of the part; followed by—the corresponding deposition of an elastomer material. The deposition is carried out in a plurality of substantially flat layers which are vertically stacked. The elastomer material is deposited in the form of a latex-based liquid composition having a dispersion of polymers in an aqueous base, and the deposition is carried out by formation and pressurized ejection of drops of a liquid composition.

11 Claims, 2 Drawing Sheets

(51) Int. Cl.
*B29C 64/386* (2017.01)
*B33Y 10/00* (2015.01)

(58) Field of Classification Search
USPC .......................................................... 700/118
See application file for complete search history.

(56) References Cited

U.S. PATENT DOCUMENTS

| | | | |
|---|---|---|---|
| 2018/0370147 A1* | 12/2018 | Peter | B29C 64/209 |
| 2019/0056248 A1* | 2/2019 | Shepherd | B25J 15/0009 |
| 2019/0217545 A1* | 7/2019 | Eller | B29C 64/112 |
| 2020/0016829 A1* | 1/2020 | Ameloot | B33Y 10/00 |
| 2020/0108548 A1* | 4/2020 | Frances | C08K 3/36 |
| 2021/0107210 A1* | 4/2021 | Gottschalk-Gaudig | B29C 64/209 |

* cited by examiner

METHOD FOR THE ADDITIVE MANUFACTURING OF AN ELASTOMER PART, AND ASSOCIATED PRODUCTION FACILITY AND PART

RELATED APPLICATIONS

The present application is a U.S. National Stage application of International PCT Application No. PCT/EP2019/058059 filed on Mar. 29, 2019 which claims priority benefit of French Application No. FR 18 52749 filed on Mar. 29, 2018, the contents of each are incorporated by reference in their entirety.

FIELD OF THE INVENTION

The present invention relates to a method for additive manufacturing of an elastomer part, of the type comprising the following steps: creation of a first computer model comprising spatial coordinates of said elastomer part; then deposition, in accordance with said spatial coordinates, of at least a first elastomer material; said deposition being carried out in several substantially flat layers, stacked vertically; wherein the step of creating the first computer model comprises definition of the spatial coordinates of each of said layers of the first material.

BACKGROUND OF THE INVENTION

It is known to produce flexible parts, for example prototypes, by means of additive manufacturing or 3D printing methods. Document US20160185040 describes, for example, the manufacture of a part by depositing a hot strand of raw rubber, followed by vulcanization.

The use of raw rubber does not allow very precise deposition to be obtained. The Applicant has therefore studied the production of flexible prototypes from a liquid latex-based composition, i.e. from a suspension of polymers in an aqueous base.

However, the viscosity of the latex precludes the use of known liquid deposition devices, such as ink printers. Furthermore, the deposition at too high a temperature may lead to premature vulcanization of the polymer.

SUMMARY OF THE INVENTION AND DESCRIPTION OF EMBODIMENTS

To this end, the invention relates to an additive manufacturing method of the aforementioned type, in which: at least a first elastomer material is deposited in the form of a liquid composition based on latex; and the deposition is carried out by forming drops of liquid composition and ejecting said drops under pressure.

According to other advantageous aspects of the invention, the method has one or more of the following characteristics, taken in isolation or in any technically feasible combination:

the liquid latex-based composition comprises a dispersion of polymers in an aqueous base, said liquid composition comprising at least 40% by weight of water and between 30% and 70% by weight of polymers;

at least a first elastomer material is a natural or synthetic rubber; the drops of liquid composition have a volume of between 0.1 nl and 1000 nl, preferably between 0.25 nl and 1.00 nl and more preferably between 0.40 nl and 0.60 nl;

each substantially planar layer has a thickness between 10 μm and 100 μm and more preferably between 30 μm and 70 μm;

the method comprises drying steps alternating with the steps of depositing layers of at least a first elastomer material, each drying step leading to at least partial evaporation of the aqueous base of one of said layers and to the formation of a solid surface on said layer, said solid surface being intended to support the next layer of at least a first elastomer material;

the method comprises the following steps: creation of a second computer model, comprising spatial coordinates of a support of the elastomer part; then deposition, in accordance with said spatial coordinates, of at least a second material of said support; said deposition being carried out in several substantially flat layers, stacked vertically; the step of creating the second computer model comprising defining the spatial coordinates of each of said layers of the second material, each layer of at least one second material being substantially coplanar with at least one layer of first material;

the deposits of substantially coplanar layers of at least a first and at least a second material are substantially simultaneous;

the liquid latex-based composition further comprises at least one vulcanization additive; and the method then comprises a step of vulcanizing the at least a first elastomer material.

The invention further relates to an additive manufacturing facility comprising: a first device for dispensing at least one first elastomer material; a device for moving said first dispensing device; an electronic module for managing said devices; and means for implementing a manufacturing method as described above.

According to other advantageous aspects of the invention, the facility has one or more of the following characteristics, taken in isolation or in any technically feasible combination:

the first device for dispensing the at least one first elastomer material comprises a dispensing head and a reservoir of liquid latex-based composition, connected to said head, the reservoir being in overpressure with respect to atmospheric pressure, the dispensing head comprising: an ejection orifice communicating with the reservoir; and a needle designed to move towards and away from said ejection orifice in an oscillating movement, so as to project under pressure the drops of the liquid composition out of said ejection orifice;

the facility further comprises a second device for dispensing the at least one second material;

the facility further comprises at least one drying member.

The invention further relates to an elastomer part resulting from a manufacturing method as described above.

BRIEF DESCRIPTION OF THE DRAWINGS

The invention will be better understood upon reading the description which follows, given solely by way of non-limiting example and made with reference to the drawings in which.

DETAILED DESCRIPTION OF THE DRAWINGS

Figure 1:
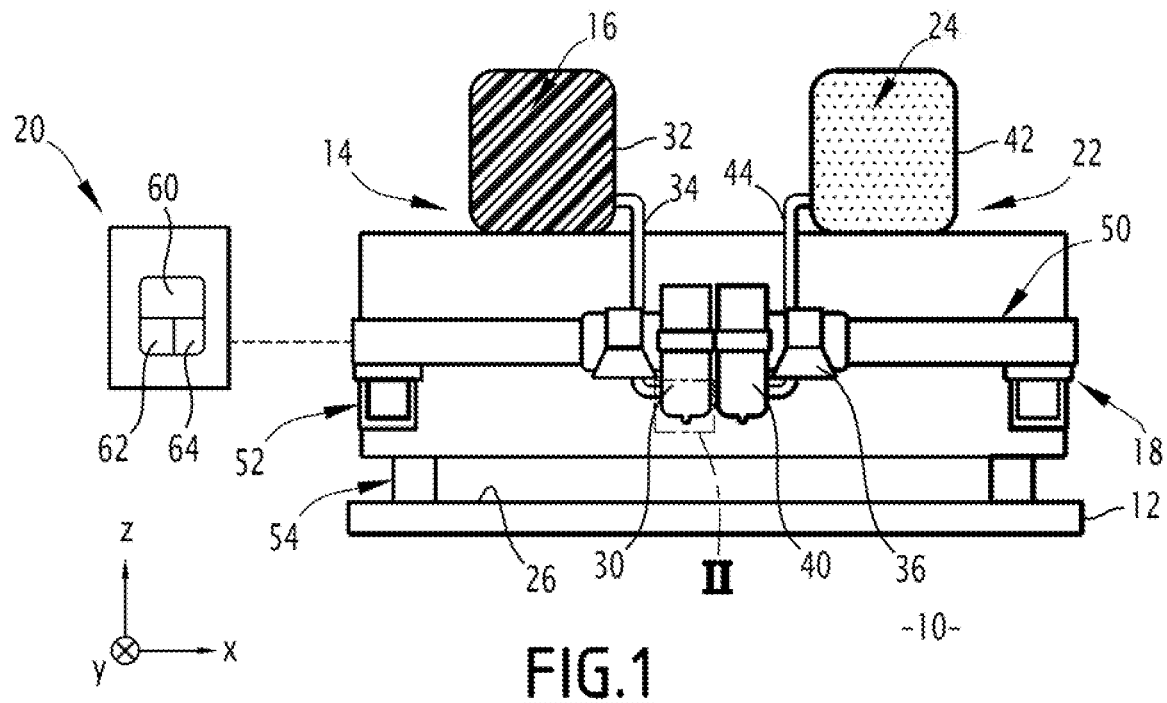
FIG. 1 is a schematic representation of an facility according to one embodiment of the invention.

FIG. 1 shows a facility 10 for the production of an elastomer part by additive manufacturing. More specifically, the facility 10 is intended for the production of a part 100 (FIG. 3) in a material of rubber of a natural or synthetic type.

The facility 10 comprises: a manufacturing platform 12; a first device 14 for dispensing at least one first elastomer material 16; a device 18 for moving said first dispensing device 14; and an electronic module 20 for managing said devices 14, 18. In the embodiment shown, the facility 10 further comprises a second device 22 for dispensing at least one second support material 24.

The plate 12 comprises a substantially planar surface 26, intended to receive the manufacturing materials 16, 24. In an operating position of the facility 10, said surface 26 is substantially horizontal and oriented upwards.

The surface 26 has, for example, a substantially rectangular outline. In the remainder of the description, an orthonormal basis (X, Y, Z) is considered, the Z direction representing the vertical while the X and Y directions are parallel to the edges of the surface 26.

The first dispensing device 14 is designed to dispense at least a first elastomer material 16 for the manufacture of the part 100. To this end, the first dispensing device 14 comprises: a dispensing head 30, a reservoir 32 of a first elastomer material 16 and a duct 34 connecting said reservoir to said head. The dispensing head 30, the reservoir 32 and the duct 34 will be described in more detail below.

According to an embodiment not shown, the first dispensing device 14 is designed to distribute several elastomer materials for the manufacture of the part 100. To this end, the dispensing device may comprise, for example, several reservoirs filled with different materials, said reservoirs being connected to a single dispensing head, or each reservoir being connected to a separate head.

The first elastomer material 16, as contained in the reservoir 32 and dispensed by the dispensing head 30, is a liquid latex-based composition, comprising a dispersion, stable at the colloidal level, of polymers in an aqueous base.

According to one embodiment, the liquid composition 16 is formed from a natural latex, extracted from a plant such as rubber, guayule or dandelion. According to this embodiment, the liquid composition 16 is especially rich in polyisoprenes.

According to another embodiment, the liquid composition 16 comprises polymers of synthetic origin, such as styrene-butadiene, styrene-acrylic copolymers or fluoropolymers such as PTFE.

Preferably, the liquid composition 16 comprises between 30% and 70%, and more preferably between 50% and 60%, by weight of polymers relative to the total weight of the composition. Preferably, the particle size of the polymers lies between 100 nm and 1 µm. However, nanopolymers with a particle size smaller than 100 nm may also be used.

Preferably, the liquid composition 16 comprises at least 40% of water relative to the total mass of the composition, so as to limit its viscosity. Preferably, the viscosity of the liquid composition 16 lie between 10 mPa·s and 400,000 mPa·s, and more preferably between 100 mPa·s and 10,000 mPa·s.

According to one embodiment, the liquid composition 16 further comprises one or more additives allowing vulcanization of the rubber, such as sulfur compounds.

According to one embodiment, the liquid composition 16 further comprises one or more other additives such as colorants.

In the embodiment not shown where the first dispensing device is capable of dispensing several elastomer materials, said materials are preferably chemically compatible. Preferably, the several reservoirs are filled with similar liquid compositions, which differ, for example, by different dyes.

Figure 2:
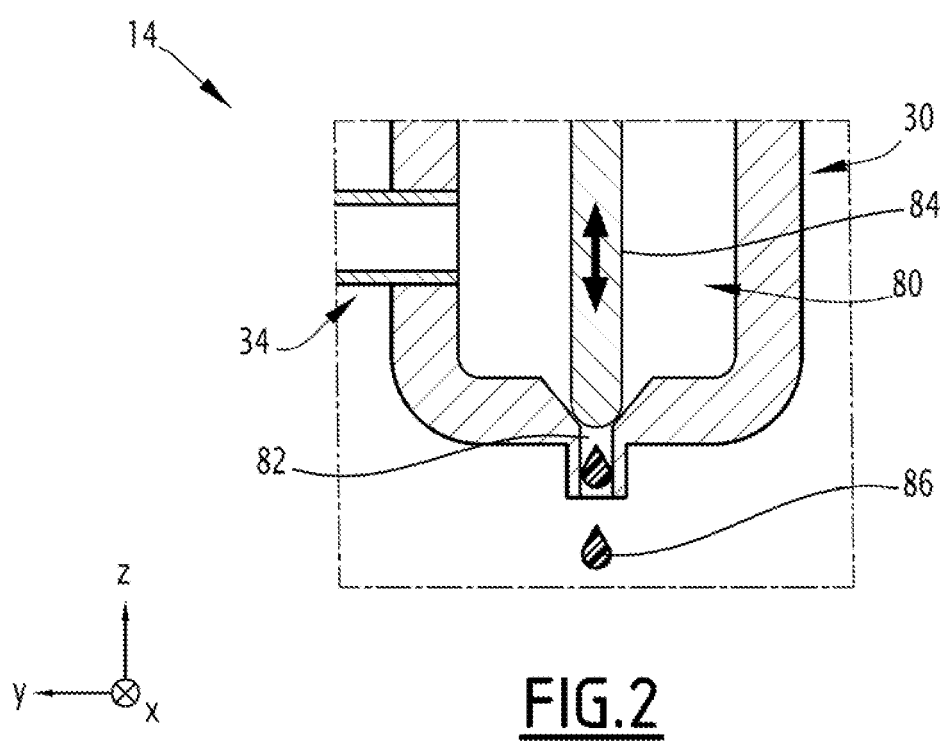
FIG. 2 is a partial sectional view of the facility of FIG. 1.

FIG. 2 shows a detail view, in section, of the first dispensing device 14, and, in particular, of the dispensing head 30 and of the duct 34.

The dispensing head 30 comprises an ejection chamber 80, connected to the reservoir 32 of liquid composition 16 via the duct 34. The reservoir 32 is at an overpressure with respect to atmospheric pressure, said overpressure lying between 0.1 bar and 49 bar and more preferably between 0.5 bar and 3 bar.

The ejection chamber communicates with the outside of the dispensing head 30 through an ejection orifice 82. Said ejection orifice 82 has a diameter preferably between 50 µm and 600 µm.

The dispensing head 30 further comprises a needle 84 disposed in the ejection chamber. The needle 84 is able to move towards and away from the ejection orifice 82 in an oscillating translational movement along Z, so as to project under pressure drops 86 of the liquid composition 16 out of said ejection orifice. The needle 84 may be, for example, connected to a piezoelectric element (not shown) which deforms under an electric pulse.

The drops 86 have microscopic dimensions, preferably a diameter of between 80 µm and 120 µm approximately, and more preferably of the order of 100 µm. The size of the drops is exaggerated in FIGS. 2 and 3.

Such drop sizes allow great precision for the deposition of the liquid composition 16. The drops 86 have a volume between 0.1 nL and 1000 nL, preferably between 0.25 nL and 1 nL, more preferably between 0.40 nL and 0.60 nL and even more preferably of the order of 0.5 nL.

The pressurization makes it possible to form and eject drops of a viscous liquid, such as the liquid composition 16. By comparison, conventional print heads of the thermal or piezoelectric inkjet type do not make it possible to pressurize the liquid. The ejection of a liquid in the viscosity range of liquid composition 16 is then problematic, if not impossible. Moreover, technologies involving heating of the liquid may lead to untimely vulcanizations of the latex.

Preferably, the dispensing head 30 is of the "jet valve" type. Such dispensing heads are, for example, marketed by the companies Nordson, Vermes, Marco, Advanjet or PVA.

Preferably, the first dispensing device 14 further comprises one or more drying members 36. Such a drying member comprises, for example, an infrared radiation heating element, or an element blowing heated or unheated air.

The second dispensing device 22 is designed to distribute at least a second support material 24 during the manufacture of the part 100. As will be described below, the second support material 24 is intended for the production of a support 102 (FIG. 3) simultaneously with the production of the part 100. To this end, the second dispensing device 22 comprises: a dispensing head 40, a reservoir 42 of second support material 24 and a duct 44 connecting said reservoir to said head.

The second support material 24, as contained in the reservoir 42 and distributed by the dispensing head 40, is preferably a fluid composition. By "fluid" is meant a liquid or viscous composition. The second support material 24 may be, for example, a soluble polymer, advantageously water-soluble. Preferably, the second support material 24 is chosen from polymers of the glycol type, such as polyethylene glycols (PEG), polyvinyl acetates (PVA), polylactic acids (PLA).

The displacement device 18 is able to move in the three directions X, Y, Z the dispensing head(s) 30 of the first dispensing device 14, as well as the dispensing head 40 of the second dispensing device 22.

The displacement device 18 comprises, for example, several linear actuators 50, 52, 54, able to move said dispensing heads 30, 40, respectively in the directions X, Y and Z. The linear actuators 50, 52, 54 may be, for example, of the cylinder type.

The electronic module 20 is electronically connected to the dispensing heads 30, 40, to the drying members 36 and to the linear actuators 50, 52, 54.

The electronic module 20 comprises, in particular, a microprocessor, a program memory and at least one communication bus. A program 60 is stored in the electronic module 20.

The program 60 is able to integrate a first computer model 62 of the part 100, said first computer model comprising spatial coordinates defining the shape of said part 100. The program 60 is also able to integrate a second computer model 64 of the support 102 of the part 100, said second computer model comprises spatial coordinates defining the shape of the support 102.

The program 60 is able to implement manufacturing of the part 100 and of the support 102 from the first 62 and second 64 computer models, as described below. More precisely, the program 60 is able to control the operation of the dispensing heads 30, 40, of the drying members 36 and of the linear actuators 50, 52, 54.

The part 100 and the support 102 described above are produced by an additive manufacturing method or 3D printing. A step of such a method for manufacturing the part 100 and the support 102 is shown, in particular, in FIG. 3. Said method, implemented by the facility 10 described above, is described below.

A first phase of the method comprises the creation of the first computer model 62 of the part 100. Said first computer model associates the first elastomer material 16 with each point of the part 100 defined in the form of spatial coordinates. In the embodiment not shown where the facility 10 is able to distribute several elastomer materials, said first computer model associates a specific material with each point of the part 100.

Said first phase of the method comprises the creation of the second computer model 64 of the support 102 of the part 100. Said second computer model associates the second support material 24 with each point of the support 102 defined in the form of spatial coordinates.

Preferably, the first 62 and second 64 computer models provide for the part 100 and the support 102 to have complementary shapes, so as to be in contact with each other at the end of the manufacturing method.

The first 62 and second 64 computer models thus created are integrated into the program 60 of the electronic module 20.

Figure 3:
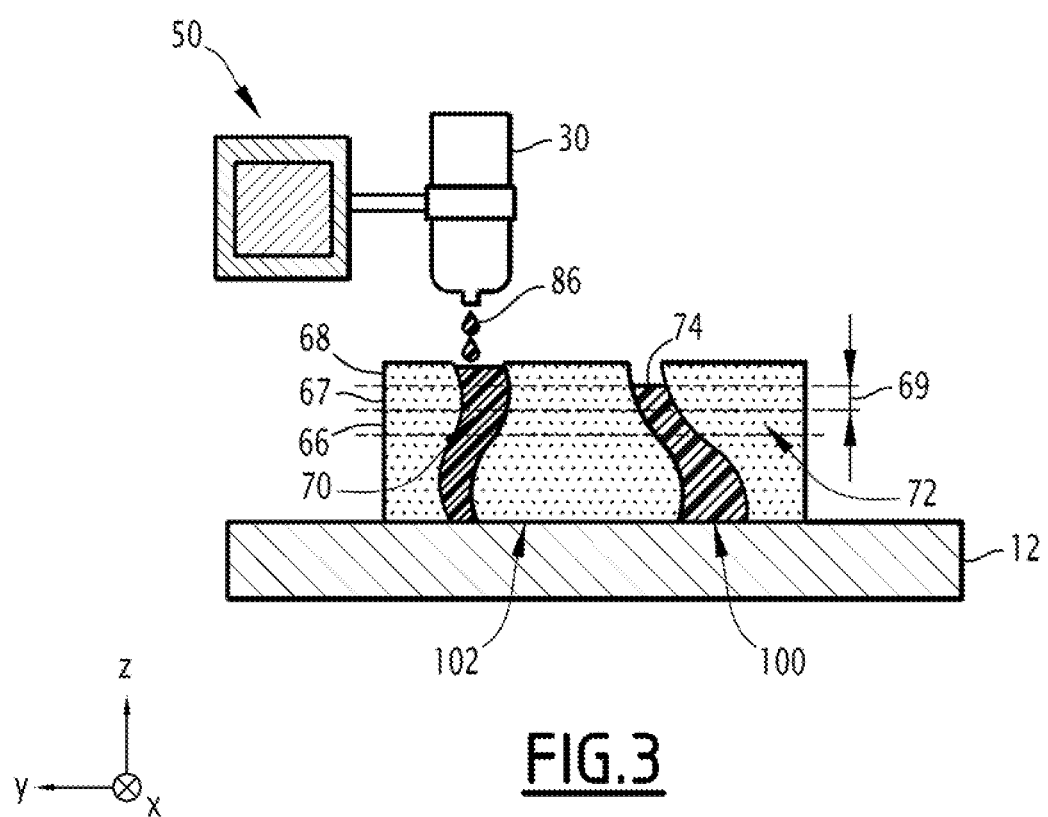
FIG. 3 is a partial sectional view of a step of a method according to one embodiment of the invention, implemented using the facility of FIG. 1.

Preferably, the program 60 provides for the decomposition of the part 100 and of the support 102 into several layers 66, 67, 68, corresponding to successive steps of depositing the first elastomer material 16 and second support material 24. In FIG. 3, the layers 66 and 67 are complete and layer 68 is in progress.

Each layer 66, 67, 68 is delimited by two planes (X, Y) spaced apart by a height 69 along Z. The heights 69 of the different layers 66, 67, 68 may be identical or different.

Preferably, the height 69 of each layer 66, 67, 68 of the part 100 is between 10 µm and 100 µm, more preferably between 30 µm and 70 µm and even more preferably of the order of 50 µm. The height 69 is exaggerated in FIG. 3.

According to one embodiment, the height 69 of each layer 66, 67, 68 is designed during the creation of the first 62 and second 64 computer models. According to another embodiment, the height 69 of the layers 66, 67, 68 is provided by default in the program 60.

Preferably, according to the program 60, at least one of the layers 66, 67, 68 comprises a first portion 70 belonging to the part 100 and a second portion 72 belonging to the support 102. Said first 70 and second 72 portions are in contact with one another to form a continuous layer. More preferably, several layers 66, 67, 68 each comprise a portion of the part 100 and a portion of the support 102 in contact with one another.

A second phase of the method comprises depositing, on the surface 26 of the plate 12, the first elastomer material 16 and second support material 24, in accordance with the first 62 and second 64 computer models. The deposit of the first elastomer material 16 is deposited in the form of microdrops 86, which allows significant spatial precision of said deposit.

The second phase of the method comprises several successive steps of depositing said materials 16, 24, each step corresponding to the production of a layer 66, 67, 68. To this end, simultaneously with the dispensing of each material 16, 24, the corresponding dispensing head 30, 40 is moved according to the spatial coordinates of each layer 66, 67, 68.

The second phase of the method further comprises alternating drying steps with the steps of depositing the materials 16, 24 of each layer 66, 67, 68 forming the part 100. Each drying step leads to at least partial evaporation of the base. of the first elastomer material 16 of the corresponding portion 70 of said part 100. This results in the formation, on said portion 70, of a solid surface 74 shown in FIG. 3 for the layer 67. Said solid surface 74 is, in particular, suitable in supporting the first elastomer material 16 entering into the manufacture of the next layer 68.

Preferably, each drying step is carried out by means of the drying member(s) 36, by radiant heating or by blowing with heated or unheated air. According to one embodiment, the drying is carried out by blowing with air heated between 50° C. and 80° C.

For each layer 66, 67, 68 comprising a first portion 70 and a second portion 72 as described above, the deposits of materials 16 and 24 are substantially simultaneous. Preferably, for the same layer 66, 67, 68, the support material 24 of the second portion 72 is deposited before the elastomer material 16 of the first portion 70. Thus, said second portion 72 contains said elastomer material 16 and prevents it flowing before the next drying step.

As is known in the field of 3D printing, the presence of the support 102 makes it possible to horizontally shift the successive layers of first elastomer material 16 to give a complex shape to the part 100.

In the embodiment in which the first elastomer material 16 comprises at least one vulcanization additive, the method optionally comprises a third vulcanization phase after depositing all of the layers 66, 67, 68 forming the part 100. Said vulcanization phase may be carried out, for example, by baking in an oven (not shown) or by irradiation under electron beams or under UV rays.

The support 102 is then separated from the elastomer part 100 thus obtained.

An example of the implementation of the above method from facility 10 is detailed below:

Parallelepipedal test specimens are made from an aqueous composition of natural rubber latex comprising at least 40% by weight of water and between 30% and 70% by weight of polymers.

Each test piece is made by successively depositing 10 layers of aqueous composition, each layer having a square area of about 4 mm on a side and a thickness of about 30 µm. Between layers, drying is carried out by blowing hot air and a heating mat.

In this example, the method does not include the deposition of a support material.

During the manufacture of the test pieces, perfect wetting of the previous surface, perfect adhesion of the layers to each other and perfect drying were observed.

A baking cycle of 20 minutes at 120° C. is then carried out on the test pieces.

Mechanical tests were carried out on the manufactured specimens:

Characteristic of the Specimens

Width=4 mm
Thickness=0.34 mm

Results

Stress at break: 13.9 MPa
Deformation at break: 710%
Hardness: 30 ShA

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Additive manufacturing method for an elastomer part, comprising the following steps:
   creating a first computer model having spatial coordinates of said elastomer part; then
   depositing, in accordance with said spatial coordinates, at least a first elastomer material, said elastomer material being a latex material;
   said depositing being effected in several substantially flat layers stacked vertically; the step of creating the first computer model comprising definition of the spatial coordinates of each of said layers of first material,
   wherein said at least said first elastomer material is deposited in the form of a liquid composition based on latex; and
   wherein the depositing is carried out by forming drops of liquid composition and ejection under pressure of said drops, the drops of liquid composition having a volume between 0.1 nL and 1000 nL.

2. Additive manufacturing method according to claim 1, wherein at least one first elastomer material is a natural or synthetic rubber, the liquid latex-based composition comprising a dispersion of polymers in an aqueous base; said liquid composition comprising at least 40% by weight of water and between 30% and 70% by weight of polymers.

3. Additive manufacturing method according to claim 1, wherein the drops of liquid composition have a volume between 0.25 nL and 1.00 nL.

4. Additive manufacturing method according to claim 1, comprising alternating drying steps with the steps of depositing layers of at least a first elastomer material, each drying step leading to at least partial evaporation of the aqueous base of one of said layers and forming a solid surface on said layer, said solid surface being adapted to support the next layer of at least a first elastomer material.

5. Additive manufacturing method according to claim 1, further comprising the following steps:
   creating a second computer model, comprising spatial coordinates of a support of the elastomer part; then
   depositing, in accordance with said spatial coordinates, of at least a second material of said support;
   said depositing being effected in several substantially flat layers stacked vertically; the step of creating the second computer model comprising a definition of the spatial coordinates of each of said layers of second material,
   each layer of at least one second material being substantially coplanar with at least one layer of first material.

6. Additive manufacturing method according to claim 5, wherein at least one second material is deposited before the first material of the same layer substantially coplanar.

7. Additive manufacturing method according to claim 1, wherein:
   the liquid latex-based composition further comprises at least one vulcanization additive; and
   the method then comprises a step of vulcanizing at least a first elastomer material.

8. Additive manufacturing facility comprising:
   a first dispensing device for dispensing at least a first elastomer material, said first device comprising a dispensing head and a reservoir of latex-based liquid composition, connected to said head,
   a device for moving said first dispensing device;
   an electronic module for managing said devices; and
   a program for implementing a method according to claim 1, said program being stored in the electronic module;
   the reservoir being at an overpressure relative to atmospheric pressure, the dispensing head comprising: an ejection orifice communicating with the reservoir; and a needle designed to move towards and away from said ejection orifice in an oscillating movement, so as to project under pressure the drops of the liquid composition out of said ejection orifice.

9. Additive manufacturing facility according to claim 8, said facility further comprising a second dispensing device for dispensing at least one second material.

10. Additive manufacturing facility according to claim 8, further comprising at least one drying member.

11. Additive manufacturing method according to claim 3, wherein the drops of liquid composition have a volume between 0.40 nL and 0.60 nL.

* * * * *